March 1, 1932. G. M. ASHTON 1,847,914
VEHICLE BRAKING MECHANISM
Filed Oct. 31, 1927
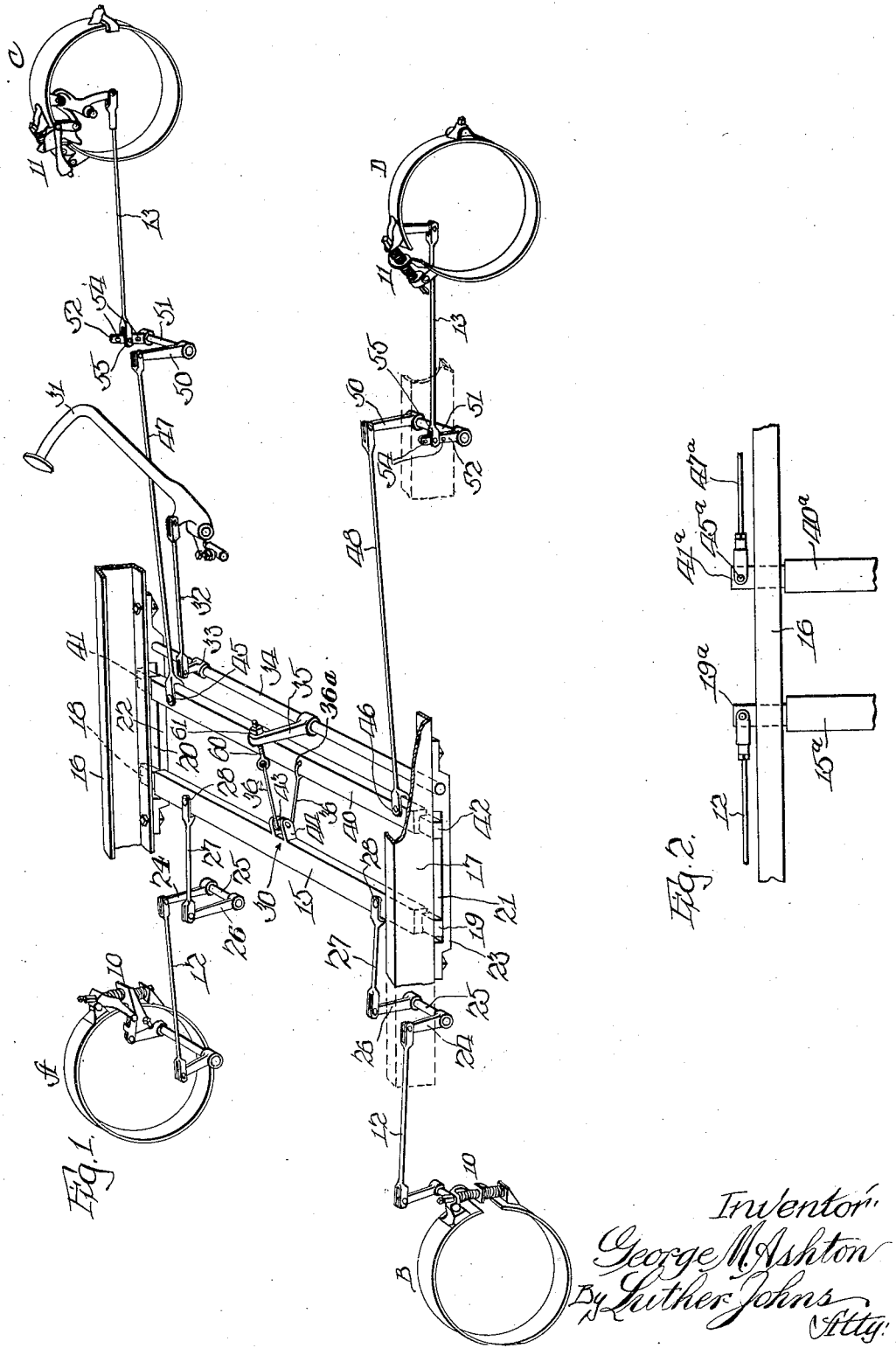

Patented Mar. 1, 1932

1,847,914

UNITED STATES PATENT OFFICE

GEORGE M. ASHTON, OF DENVER, COLORADO

VEHICLE BRAKING MECHANISM

Application filed October 31, 1927. Serial No. 229,872.

These improvements relate to braking devices or systems for wheeled vehicles chiefly of the automobile type.

The prime object is to provide a simple system for improving the braking results whether for a single pair of wheels or for two pairs, through an automatically adjusted distribution of braking forces to the respective brakes or brake units proper.

In the drawings which form a part hereof I have shown these improvements in a perspective in Fig. 1 which omits all of the vehicle parts except those directly involved in the present invention; and in Fig. 2 I have shown a few parts fragmentarily in top view as a modification of some of the connections.

The brake bands A and B constitute a pair of braking elements for the rear wheels of what will be understood to be an automobile, while the brake bands C and D constitute a similar pair of braking elements for the front wheels.

It is unnecessary to show the drums or the associated wheels in this connection as the construction and operation of such drums and wheels is well understood. All we need to consider here in that connection is means for constricting the respective brake bands upon their associated drums. In this matter also it is unnecessary to describe these band-tightening means in detail since they may be of many different constructions all well known at this time. It is therefore deemed sufficient here to state that the mechanism marked 10 associated with bands A and B and the mechanism marked 11 associated with bands C and D are mechanisms for drawing the brake bands taut or in binding relation to the associated drums, and that a forward pull upon the connecting rods 12 and a rearward pull upon the connecting rods 13 will cause these braking mechanisms 10 and 11 to cause the desired friction between the bands and the drums respectively. The brake bands as A, B, C and D and the mechanisms as 10 and 11 will be termed herein the brake proper or a brake unit. The rods 12 and 13 are connected with such brakes proper or brake units respectively to operate them for braking effects.

I provide an equalizer bar 15 shown as extending from one side frame member 16 to the opposite side frame member 17, the bar being mounted for fore-and-aft sliding movements and also for tilting movements in the normally horizontal plane. For this purpose the opposite ends 18 and 19 of the bar 15 are shown as being of reduced cross-section, and these reduced ends extend into ways 20 and 21 respectively formed by brackets 22 and 23 secured upon the bottom of the side frame member 16 and 17 respectively. In Fig. 1 the rods 12 are outside the frame of the automobile and are shown as being connected respectively with the crank arm 24 mounted on a shaft 25 which is to be understood as being carried in a suitable bearing by the frame of the automobile, there being also a crank arm 26 extending parallel to the crank arm 24, and then there is a link 27 connecting the crank arm 26 to the bar 15. The only object of this construction comprising the parts 24, 25, 26 or 27 is to communicate the pull from a place inside the frame, or between the two frame members 16 and 17, to the mechanism 10 outside the frame.

In this connection reference may be made to Fig. 2 where the corresponding equalizer bar 15a has its reduced ends 19a extending beyond the frame and the rod 12 extends forward to that exposed free end 19a, thus omitting the bell cranks 24 and 26 and the associated parts as next above described.

If the bar 15 were drawn upon at 30, namely at a point midway between the connections at 28, the bar 15 would act as an equalizer to such effect that the ultimate braking force would be applied substantially equally to the brake bands A and B. To apply the braking forces to the bar 15 I have shown the conventional foot pedal 31 pulling upon the rod 32 connected by a lever arm 33 to the shaft 34 shown as having its ends pivoted in the brackets 22 and 23 respectively. This shaft 34 carries a lever arm 35 to which is connected a flexible element 36, suitably a wire rope or cable, leading to the equalizer bar 15.

Let us assume for the moment that the front wheels are not provided with braking mechanisms and that the flexible element 36 is either a flexible element or a rigid link connected directly to and for direct pulling strains upon the bar 15 at this midway place 30. In that case when the pedal 31 is depressed the direct pull at 30 would be communicated substantially equally to the brakes proper including the bands A and B to provide substantially the same braking effects in each, and if the individual adjustment of one varied from the other the bar 15 would not only move forward but would tilt somewhat to take up the slack or play caused by a looser adjustment at or for one brake unit than at or for the other, and when this slack or play is taken out of the looser one the continuing pull applies the braking strains substantially equally upon both of the rear units.

I have shown also how the braking forces may be applied with like effect to the front brakes where such are employed. To this end I provide a second equalizer bar 40 having its ends 41 and 42 mounted in the ways 20 and 21 respectively for movements already described for the bar 15, but in the reverse direction, namely, to the rear; and I have shown the flexible pulling element 36 as passing around pulley 43 mounted in a bracket 44 carried by the bar 15, this flexible member 36 extending at 36a to the bar 40 and at a place midway between the connections 45 and 46, these connections 45 and 46 being for the pull rods 47 and 48 respectively. In appended claim I call this connection between the two equalizer bars cord-and-pulley means.

In Fig. 2 I have shown the bar 40a corresponding to the bar 40 as having its ends 41a extending beyond the automobile frame and pull rods 47a connected at 45a to these free and outwardly projecting ends of the bar 40a. With respect to Fig. 2 it is to be understood that all of the associated mechanisms shown in Fig. 1 are to be considered as being present in the construction partly shown by Fig. 2 and that Fig. 2 merely shows how the levers and associated parts carrying the braking strains outside the frame may be avoided.

Reverting to Fig. 1, the rods 47 and 48 are respectively connected to levers 50 mounted on shafts 51 from which extend lever arms 52, and the pull rods 13 are shown as being connected to these arms 52.

Through the cord-and-pulley type of connection the pull strains on the bar 15 are twice those on the bar 40. Note that the arms 52 contain a plurality of holes whereby the connection at 55 may be adjusted for greater or less leverage. As illustrated the connections 55 are at an intermediate location on the lever arms 52. If the connection were made at an opening 54 farther from or closer to the shaft 51 the leverage of the arm 52 would be respectively increased or diminished, and, conversely, the leverage of the arm 50 would be decreased or increased respectively. This provision is made in view of the fact that it is sometimes preferable to have a different pull upon the fore brakes than upon the rear brakes, and it is usually desirable also that the pull or the rear brakes becomes effective to a material extent before the pull becomes effective on the front brakes. It is usually desired also to have the braking force at the rear wheels considerably greater than at the front wheels. The adjustment provided a 54 enables the manufacturer or the user from time to time to vary these factors so that when the foot pedal 31 is depressed there will be, if desired, less force, and to the extent desired applied to the front brakes than to the rear ones and therefore braking strains of a given amount or intensity will come first upon the rear brakes, and will continue to be effectively greater at all stages of the braking operation.

When the brake pedal 31 is depressed the equalizer bar 15 is moved forward, and usually with some tilting action, while the equalizer bar 40 is simultaneously drawn rearward and usually also with a tilting action, and thus the braking forces are applied substantially simultaneously to both pairs of brakes proper and substantially equally to the units of each pair. Through the adjustment provided at 54 the braking forces may be first, equally upon the front and rear wheels, or, secondly, greater upon the front wheels, or, thirdly, somewhat less upon the front wheels. Stated otherwise, the adjustment at 54 provides means for varying the amount of the braking force distributed to the front pair of units relative to the amount of such force distributed to the rear pair of units.

Note that the eye-bolt 60 has a threaded shank long enough to provide that a considerable adjustment may be made there by means of the nut 61. This adjustment is common to the entire system, and by these means the amount of effective throw of the foot pedal may be controlled in a simple and easy way and by a single adjustment.

I contemplate as being included in these improvements all such modifications, changes, departures and variations from what is thus specifically illustrated and described as fall within the scope of the appended claim.

I claim:

In a braking system for wheeled vehicles, a pair of braking units, an equalizer bar, connections between the equalizer bar and the braking units respectively, oppositely-disposed vehicle frame members, and means holding the equalizer bar at its ends at the frame members respectively for sliding movements in directions away from and toward the respective braking units and also for tilting movements in its general plane.

GEORGE M. ASHTON.